United States Patent [19]
Horvat

[11] 4,222,754
[45] Sep. 16, 1980

[54] HIGH EFFICIENCY FILTER FOR TEXTILE WASTE

[76] Inventor: Ivan J. Horvat, P.O. Box 1782, Gastonia, N.C. 28052

[21] Appl. No.: 963,371

[22] Filed: Nov. 24, 1978

[51] Int. Cl.² .......................... B01D 46/04; A47L 9/20
[52] U.S. Cl. ....................................... 55/283; 55/284; 55/290; 55/302; 55/350; 55/403; 55/431; 15/312 A; 15/352
[58] Field of Search ................. 55/270, 283, 284, 285, 55/290, 294, 302, 350, 351, 431, 403, 485; 15/312 R, 312 A, 352; 210/108

[56] References Cited

U.S. PATENT DOCUMENTS

| | | | |
|---|---|---|---|
| 2,765,048 | 10/1956 | Hersey, Jr. | 55/283 |
| 3,261,147 | 7/1966 | Allander | 55/222 |
| 3,472,002 | 10/1969 | Brown et al. | 55/294 |
| 3,486,309 | 12/1969 | Wild | 55/302 |
| 3,606,735 | 9/1971 | Baigas, Jr. | 55/283 |
| 3,667,195 | 6/1972 | Angilly, Jr. et al. | 55/283 |
| 3,708,210 | 1/1973 | Stahel et al. | 55/97 |
| 3,813,853 | 6/1974 | Anderson | 55/283 |
| 3,864,107 | 2/1975 | Baigas, Jr. | 55/290 |
| 3,888,644 | 6/1975 | Holland et al. | 55/350 |
| 3,936,902 | 2/1976 | Shackleton et al. | 15/304 |
| 3,957,639 | 5/1976 | Schoen et al. | 55/294 |
| 4,045,194 | 8/1977 | Ferri | 55/290 |

FOREIGN PATENT DOCUMENTS

| | | | |
|---|---|---|---|
| 677074 | 8/1952 | United Kingdom | 55/290 |
| 1009993 | 11/1965 | United Kingdom | 55/302 |
| 1436687 | 5/1976 | United Kingdom | 55/290 |
| 537689 | 3/1977 | U.S.S.R. | 55/283 |

*Primary Examiner*—David L. Lacey

[57] ABSTRACT

A contaminated air stream from a textile operation which includes lint, short fibers, dust and other small particles is subjected to a progressive or multi-stage filter system, in which a first stage includes a rotary drum filter covered with a fine mesh screen covering which separates the lint and long fibers from the short fibers and dust which are carried on to a second stage. At the second stage filter, which is also a rotary drum filter but covered with a media type filter material, the short fibers are separated. The remaining dust and very small particles are passed on to a third stage, which is also a rotary drum filter covered with a media of even greater density than the second stage.

Each of the rotary drum filters are provided with suction nozzles or other vacuum cleaning apparatus some of which are selectively moveable radially of the drum into close proximity to the surface of the filter for the purposes of periodic cleaning thereof and to a removed position in situations of non-cleaning. Others are stationary. Only one set of the nozzles are cleaning at any one particular time, which cleaning sequence is controlled by a control circuit which utilizes a differential pressure switch. The control circuit provides suction as required resulting from both movement of the first stage nozzle toward and away from the surface of the filter, and the operation of a damper downstream from all nozzles which is slowly opened and closed by the control circuit.

Finally, the diametrical upstream ends of the second and third stage filters are covered with media also to provide an increased filtering area in addition to the conventional peripheral filter surfaces.

18 Claims, 4 Drawing Figures

HIGH EFFICIENCY FILTER FOR TEXTILE WASTE

BACKGROUND OF THE INVENTION

In recent years, federal administrative regulations have required increasingly stringent standards for the cleanup of air from manufacturing operations, such as the textile fiber preparation operation, in which considerable quantities of lint and dust are generated to the extent that conventional equipment no longer satisfies such regulations. For example, some regulations require that the cleanup be of such efficiency that the return air contains no more than 200 micrograms of contaminants per cubic meter. The reason that such conventional equipment is unsatisfactory is because that cleanup of the contaminated air stream is generally attempted in a single or two stage operation. It is practically impossible to provide such a device which will collect the long fibers, as well as the minute dust particles simultaneously without clogging so fast as to create a significant back pressure on the incoming contaminated air stream.

Some efforts have been made to employ a multistage filter, which efforts have used either a cyclone device or a partial cyclone device upstream from a rotary drum filter to remove the heavy contaminants prior to introduction to the rotary drum filter, which may become quickly clogged with heavy particles. See, for example the U.S. Patent to Baigas No. 3,864,107. These efforts are expensive in that the parts for the two stages cannot be standardized, and further may require considerable expensive floor space in the manufacturing plant.

SUMMARY OF THE PRESENT INVENTION

It is in this environment that the present invention which involves a different approach was developed. The purpose of the instant invention is to provide a high efficiency filtering device which is capable of treating a highly contaminated air stream from a manufacturing operation such as the textile fiber preparation area (carding room) which creates exhaust air having a mixture of lint and long fibers, short fibers, and small particulate matter such as dust and the like. The system of this invention is capable of cleaning such contaminated air to a level in the range of 200–500 micrograms of particulate matter per cubic meter of air. In an alternate embodiment a smaller filter unit is designed with one less filter stage to remove contaminants at an efficiency of 500 to 750 micrograms of contaminating particles per cubic meter of air.

As designed, cleaning of the multistage filter device is fully automatic from a central stripping control system and includes in a preferred embodiment three stages. For some manufacturing areas a two stage device will be satisfactory. Each stage includes a rotary drum of substantially the same construction, however, covered with a filter media of a different type. The air with the entrained lint and dust from the mill will be pneumatically conveyed from the textile machines through properly designed hoods which are well known in the industry and into the first stage filtration compartment where a lint separating filter drum is located. This drum is covered with 70–90 mesh stainless steel screen. The periphery of the drum is provided with one or more suction nozzles which are mounted in radially moveable arrangement between a first position adjacent the surface of the screen and a removed position. The nozzles are so mounted that when the buildup of lint on the screen is greater than prescribed limits, as determined by Photohelic (trademark of Precision Instruments, Inc., Michigan City, Ind.); differential pressure switch, the suction nozzles are moved closer to the screens to such a position that doffing or stripping of lint from the screen begins. As the nozzles are moved closer, a damper in the system simultaneously opens to connect the appropriate nozzles with a central waste removal fan. The control circuit utilizing the Photohelic differential pressure switch controls the thickness of the waste layer by periodically causing stripping or cleaning of the drum filter. When the waste has been removed to a prescribed level, the control circuit will also cause deactivation of the damper retraction of the nozzle to its removed position. The lint removed from the surface of the first stage screen will be carried through a duct to condenser or other waste collector by means of a high pressure stripping fan. Both the condenser and the fan may be located in a waste room completely removed from the multistage air cleanup system.

Subsequent to passing to the first stage of the filter, the air which passes therethrough contains dust and short fibers small enough to pass with the air through the mesh of the first stage filter screen. The second stage drum filter is provided with a filter media which is designed to trap the shorter fibers and even some of the dust particles. Again, the control circuit, which includes a Photohelic differential switch operatively connected to the second stage compartment, controls the cleaning of this drum filter substantially in the same manner as the cleaning of the first stage drum filter. However, cleaning of the second stage only occurs at times when the first drum is not being cleaned. Further, the second stage drum filter is provided with media across the diametrical upstream end surface as well as around the periphery to add additional filtering surface. Four suction nozzles are thus provided for this drum, two for the periphery and two for the diametrical surface. The duct from this stage to the condenser is also provided with a damper, which is operated by the control circuit in the same manner as in the first stage except being subservient thereto.

The third or final stage filtration unit is almost identical to the second stage, except that the filter media is even more dense to remove the small, minute dust particles and achieve the final desired efficiency in the range of 200–500 micrograms per cubic meter.

It is therefore an object of the present invention to provide an improved high efficiency filter unit.

It is another object of the present invention to provide a filter system of the type described in which contaminated air is passed through a series of substantially identical rotary drum filters except having filter surface of different media, and in which each of the filter drums are automatically cleaned by a single cleaning or stripping system to maintain a layer of contaminants on the surface thereof within controlled limits.

It is yet another object of the present invention to provide a high efficiency filter system of the type described in which each of the stages thereof are cleaned automatically at a time exclusive of the cleaning of the other stages.

It is still another object of the present invention to provide an improved vacuum cleaning or stripping device for rotary drum filters in which a cleaning nozzle is moved radially from a removed position into operative relationship with the surface of the drum filter responsive to signals from a control circuit.

It is a further object of the present invention to provide a rotary drum filter having an increased efficiency because of an increased area of filter surface thereon.

Other objects and a fuller understanding of the invention will become apparent from reading the following detailed description of a prepared embodiment along with the present drawing in which.

DETAILED DESCRIPTION OF A PREFERRED EMBODIMENT

Figure 1:
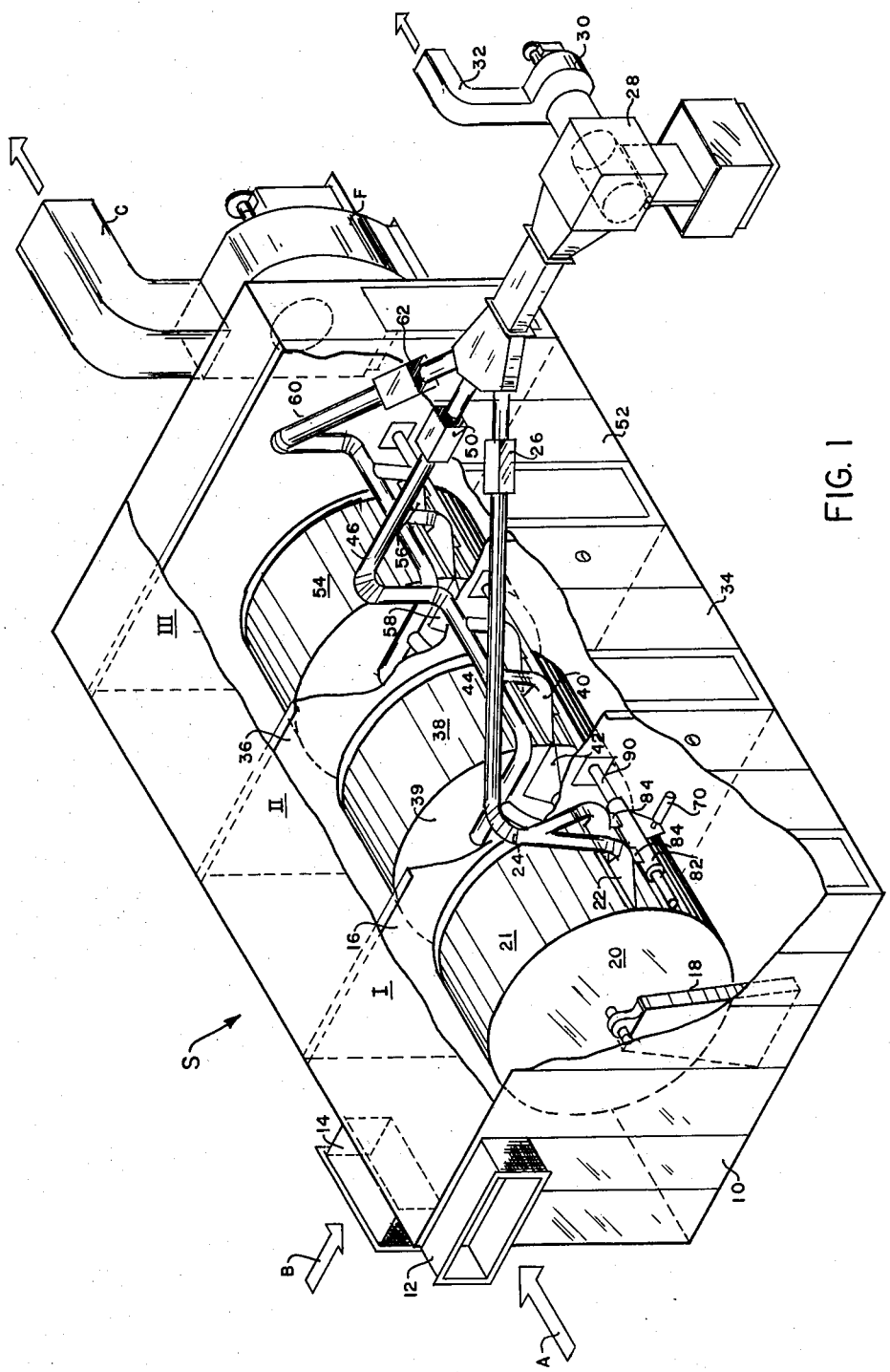
FIG. 1 is a perspective or pictorial view, with portions of the top and side walls of the system housing broken away for the sake of clarity, illustrating the system according to the present invention.

Turning now to the drawings, there is best illustrated the system S, as a whole, in FIG. 1, which shows the system S divided into three stages I, II, and III. The first stage I includes a substantially airtight housing or compartment 10 formed of walls and a roof, and having a pair of inlets 12,14 through which a main circulation fan F draws contaminated air streams A, B. The main circulation fan is of a size between 25 and 100 horsepower to project a capacity of 12,000–400,000 CFM by different static pressure.

Within the first stage compartment which is separated from the second stage II by a common wall 16, there is mounted on bearing blocks 18 a first rotary drum filter 20. The construction of the rotary drum filter itself is fairly conventional and therefore will not be described in detail; however, its suffice to say that the peripheral surface 21 thereof is covered with 70–90 mesh stainless steel screen. Further it is contemplated that the drum will either be six, eight, or ten feet in diameter depending upon the amount of air being moved. So arranged while the short fibers and dust particles will be allowed through the mesh screen, the lint and longer fibers will be entrapped therein and must be periodically removed, stripped or doffed to maintain a desired thickness of particles covering the screen, without letting such thickness increase too greatly.

Therefore, there is provided one, or preferably an assembled pair of suction nozzles 22 which are automatically moved into close proximity to the surface of the periphery 21 of drum filter 20 when the buildup of lint thereon exceeds prescribed limits. The structure for moving nozzle 22 into and out of such close proximity will be explained hereinafter. However, suffice to say here that in the retracted position, the nozzle is removed from the surface far enough so that no suction or vacuum is effected thereon. The nozzle 22 only becomes effective as it is moved closer to the surface of the periphery 21 of drum 20. Controlling the movement of the nozzle 22 is a central circuit including a Photohelic differential pressure switch 23 (see FIG. 2,--) which activates an air cylinder 70 making the adjustment to nozzle 22. The lint and longer fibers removed from the periphery 21 of drum filter 20 are carried through a conduit 24, through a damper 26, and into a condenser 28 which may be located either close to the air cleaning system S or very far away, depending upon the construction and layout of the mill and the availability of space. In the condenser 28, which is of conventional type arrangement, the lint is doffed and bailed, while the air is exhausted through a conduit 32 to the atmosphere. A stripper fan 30 provides the source of negative pressure or suction through the conduit 24 to the first stage nozzles, as well as to all the other nozzles which clean the rotary drum filters of all stages. Stripper fan 30 is a 15 horsepower fan with a capacity of 1200–1400 CFM.

Damper 26 in conduit 24 is also controlled by the control circuit and Photohelic differential pressure switch 23, so that as the nozzle 22 is moved toward the surface of the drum filter 20, the damper 26 opens to connect nozzle 22 with stripper fan 30. At other times the damper 26 is closed so that no air is being drawn through nozzle 22. It is seen that by the combination of opening the conduit 24 and the movement of the nozzle 22 toward the surface of the drum filter 20, the doffing action may be modulated to maintain a carpet of lint on the periphery of the drum filter 20 which is of a desirable thickness within prescribed ranges or tolerances. It is well known that a slightly dirty filter surface of this type is a better filter that a completely clean filter, because the buildup of waste acts as a prefilter media trapping a significant amount of smaller waste than might be caught by the screen itself. However, if too dirty the pressure drop will exceed desired limits and actually reduce the desired flow of air through the system or require undue expenditures of energy. The remaining air which passes through the media on the periphery 21 of drum 20 passes through an opening in wall 16 into the second stage II, which second stage is formed by the walls forming compartment 34. A second wall 36 separates the second stage II from the third stage III in the same manner as wall 16 separates the first two stages.

The second stage rotary drum filter 38 is very similar to the first stage rotary drum filter 20 with four exceptions. First of all, the second rotary drum filter 38 is provided with a different type of covering on the peripheral surface thereof. This surface utilizes a media type filter, designed to trap shorter fibers and large dust particles. Such media is presently commercially available. This filter media is made from several different sizes of synthetic fibers blended and processed in such a way as to produce a filter media which has larger size fibers on the air entering side and smaller size fibers on the air leaving side. The air leaving side is treated with a tacky substance which provides an extremely good particle adhering characteristic. Other filter media may also be used; however, the type described hereinabove is utilized in the preferred embodiment of the second and third stage rotary drum filters.

The second difference between the second stage filter 38 and the first stage filter 20 is that the diametrical end surface 39 of the drum is also covered with the filter media described hereinabove. It is believed that utilization of filter media across the diametrical end surface will provide 25 to 50 percent additional filter surface depending upon the diameter of the drum and the length of the peripheral surface thereof. It has not been found by applicant that such utilization of the diametrical end surface of a rotary drum filter has been used in prior embodiments, and therefore it is felt to be unique in and of itself.

The third difference between the second stage drum 38 and the first stage drum 20 is that a second nozzle 42 or assembly of nozzles 42 is provided for the filter media 39 which covers the diametrical end wall. Since the end of the drum is going to be utilized as a filtering surface, some cleaning provision must be made therefore. It is anticipated that the same type of movable filter nozzle as utilized hereinabove will be suitable. As a fourth difference, nozzles 40 and 42 are stationary and do not move, however, the cleaning action of these nozzles is controlled by damper 50.

The third stage filter 54 is identical to the second stage except that the filter media is even more dense. For example, a dense non-woven media known as Ultramat 090 synthetic filter media, a product of Moldan Corporation of Pineville, North Carolina. Such media is made from a blend of different sizes of synthetic fibers and treated with a tacky substance on the air entering side which is effective for very small dust particles.

Figure 2:
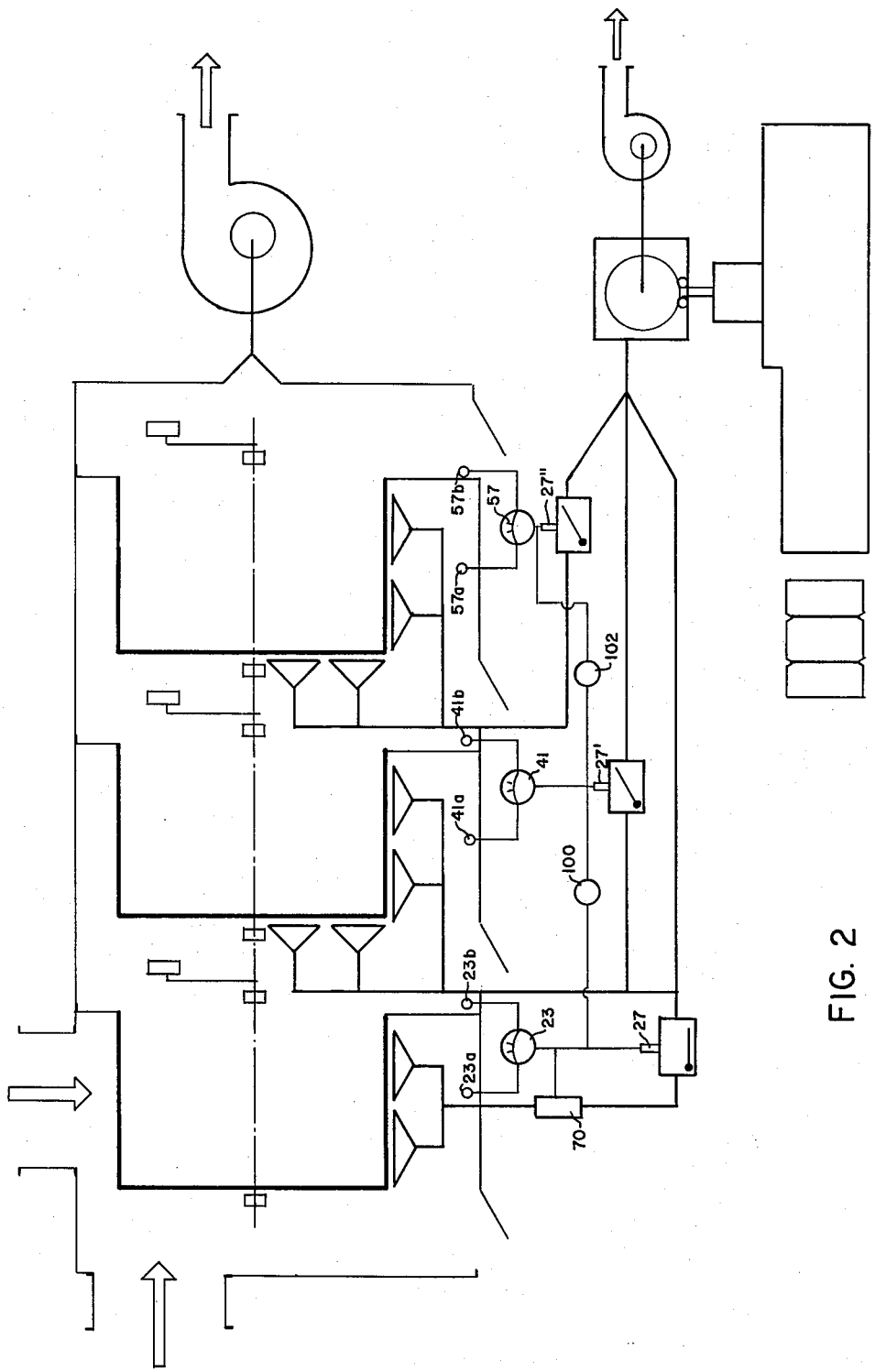
FIG. 2 is a schematic representation of the arrangement of filters and control circuit setup according to the present invention.

The short fibers removed from the second stage drum 38 and end wall surface 39 are conveyed through a conduit 46 and through damper 50 to the condenser box 28. It should be noted here that the control circuit for activating nozzles 22 and 40 are governed by Photohelic differential pressure switches 23,41 which, as indicated in FIG. 2 include sensors 23a and 23b and 41a and 41b and placed on either side of the corresponding rotary drum filters 20,38. The nozzle 22 is retracted and damper 26 closed unless pressure switch 23 indicates to control circuit that cleaning is desired. In such case, the damper begins to open allowing the suction from fan 30 to draw air through nozzle 22 and the nozzle 22 begins to move toward the filter surface 21. Second stage cleaning through nozzles 40,42 is generally continuous with the exception that if both Photohelic switches 23 and 41 indicate that cleaning of their respective rotary drum filters 20,38 is required, the first stage cleaning will take priority because of the presence of relay 100, and cleaning of the second stage drum 38 will not resume until pressure switch 23 has deactivated nozzle 22 and closed damper 26.

In a similar manner, in the third stage the pressure switch 57 includes sensors 57a and 57b for operating damper 62. It should be pointed out that because of relays 102,100 the cleaning of the third stage rotary drum filter 54 is subservient to the cleaning of the first stage filter drum 20, although it will override the second stage filter drum 38, because otherwise second stage cleaning occurs any time first or third stage cleaning is cut off.

Figure 3:
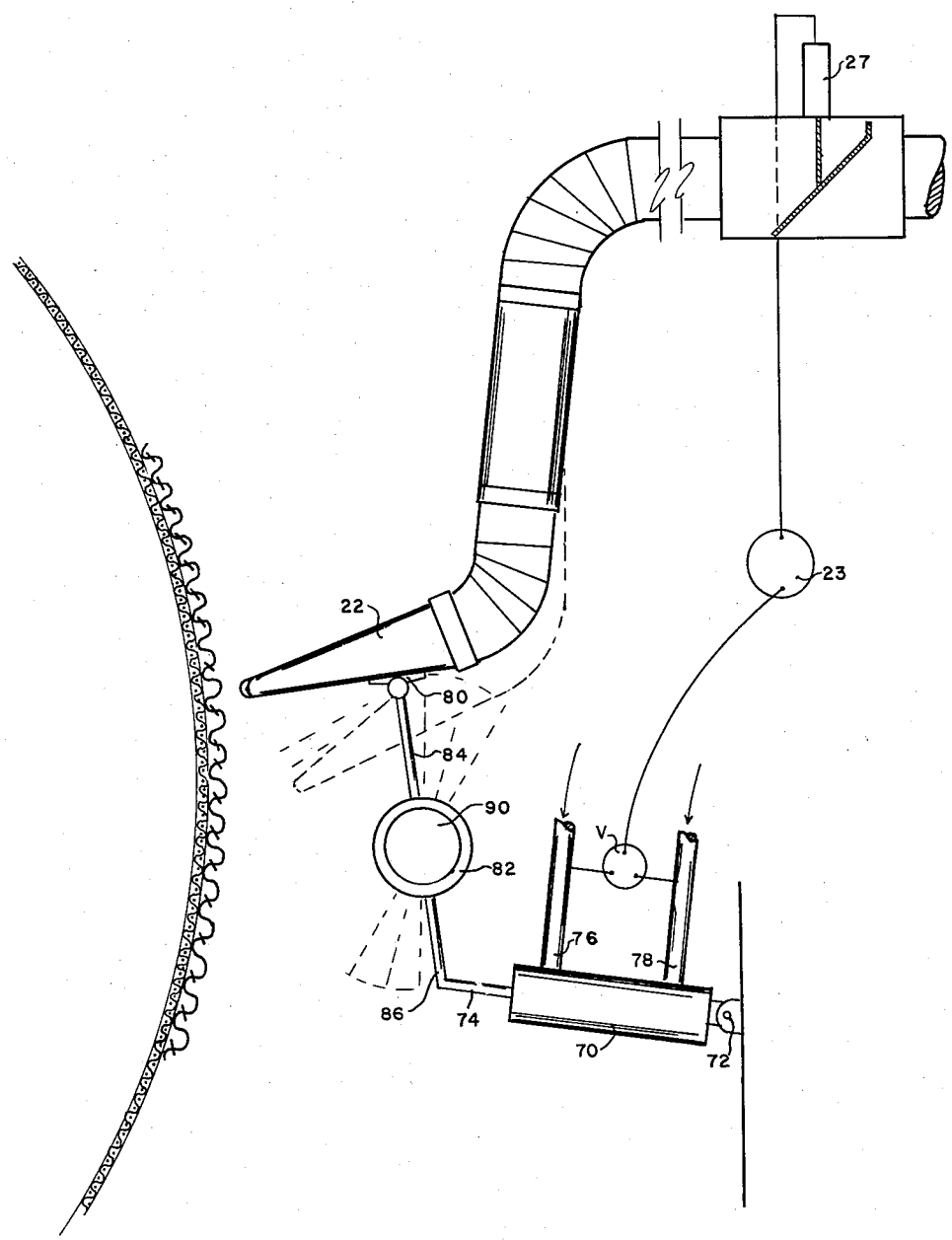
FIG. 3 is a partial side view illustrating schematically the manner in which a vacuum cleaning nozzle or nozzle assembly is moved toward and away from the surface of the filter drum.
Figure 4:
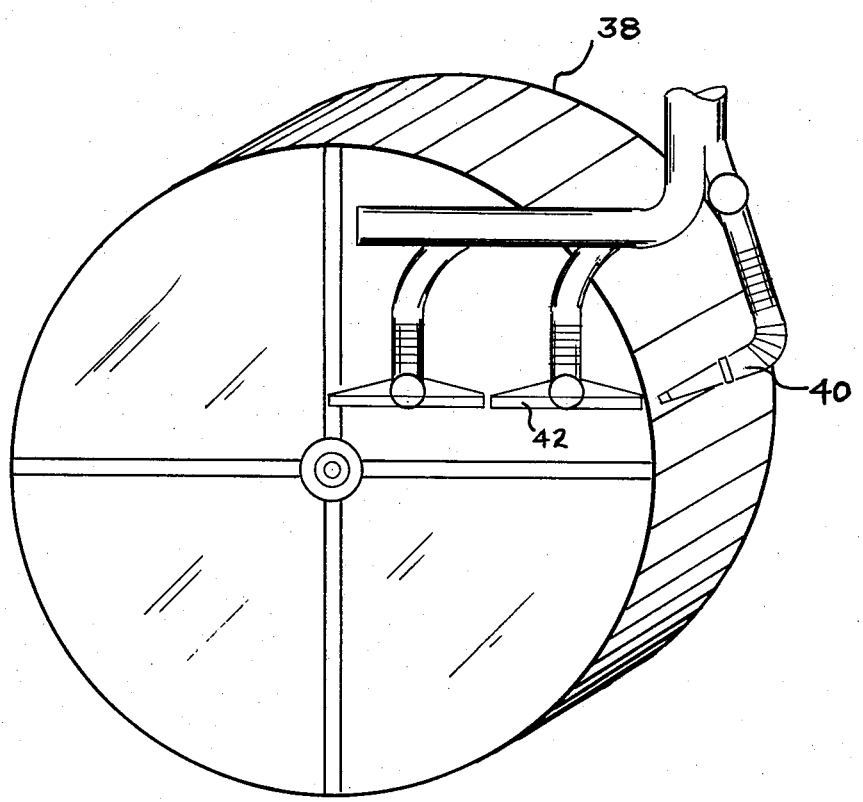
FIG. 4 is a perspective illustration of the second stage rotary drum filter according to a preferred embodiment.

Turning now to a discussion of the mechanism for moving the first stage nozzle 22, as illustrated in FIG. 3, the nozzle 22 includes a bracket 80 attached to the underneath side thereof. A support rod 90 (FIG. 1) extends between the walls of the first stage housing 10 and supports a sleeve 82 rotatably mounted thereon. One or more connecting plates 84 connect the bracket 80 with sleeve 82. A dual acting air or hydraulic cylinder 70 is suitably mounted within housing 10, as by means of a hinged bracket 72 secured to the front wall of housing 10 and having a pivot pin connected to the base of the air cylinder 70. Air cylinder 70 includes a piston rod 74 extending from the opposite end thereof from that which is attached. Piston rod 74 reciprocates back and forth as air is introduced to one or the other of air entrances 76,78. A second connecting plate 86 connects the free end of piston 74 with sleeve 82. As assembled, when the piston 74 is extended, as illustrated by the dotted line position in FIG. 3, sleeve 82 is caused to rotate around support rod 90 in a clockwise direction causing an arcuate movement of the first support plate(s) to rotate to the dotted line position. This causes a resulting retraction of nozzle 22 away from the surface 21 of the rotary drum filter 20.

Also, it should be recalled that the damper 26 works in cooperation with the movement of nozzle 22. Toward this end, any sort of conventional damper control mechanisms such as a solenoid 27 may be utilized in connection with the damper to move said damper when receiving an electrical signal generated by said pressure differential switch 23, it being obvious that the solenoid 27 and pressure differential switch 23 are electrically connected together. In addition, the pressure switch is electrically connected to valves V for the air cylinder in a conventional manner to activate and deactivate piston 74 of the air cylinder 70.

There has thus been described and illustrated a preferred embodiment of the multistage filter system according to the present invention. Obviously, various changes and alterations might be made without substantially departing from the scope and intent of the invention which is set forth by the claims hereinbelow.

What is claimed:

1. A high efficiency filter system for cleaning a contaminated air stream returning from a textile production area and the like comprising:
   (a) a plurality of sequential filter stages, each stage being housed within a separate compartment substantially isolated from the others of said compartment;
   (b) inlet means for introducing said contaminated air stream to the first of said compartments; means for transferring the output of each stage to the next compartment; and outlet means through which the output of the final stage is returned to the production area;
   (c) each of said filter stages including a rotary drum filter mounted within the corresponding compartment and a stripping means selectively operatively associated with at least the periphery of each of said drum filters for cleaning the filter surfaces thereof, each of said rotary drum filters having a filter media of a different type covering the peripheral surfaces thereof;
   (d) control means connecting all of said stages for automatically and periodically, but not continuously, activating an individual one of said stripping means to effect cleaning of the peripheral surface of the corresponding rotary drum filter exclusively of the others.

2. The filter system according to claim 1 wherein said stripping means for at least said first stage filter drum includes:
   (a) at least one nozzle connected to a vacuum source;
   (b) means for mounting said at least one nozzle for movement in a radial direction with respect to said first stage filter drum responsive to said control means from a first retracted position out of operative relation with the surface of said drum filter to a second stripping position in operative relation with said drum filter.

3. The filter system according to claim 2 wherein said menas for mounting said at least one nozzle includes a support rod mounted to extend in spaced parallel relation to the periphery of said drum filter to be stripped, a bracket pivotally mounted to said support rod and extending upwards and downwards from said bracket, said at least one nozzle attached to the upper end of said bracket, and the piston of a dual acting air cylinder connected to a source of compressed air and mounted in transverse relation to said support rod and attached to the lower end of said bracket, said air cylinder connected to and operated responsive to said control circuit, whereby said at least one nozzle is moved back and forth between said first and second positions as said air cylinder is activated in either direction.

4. The filter system according to claim 3 wherein said control means includes:
   (a) a sensor means positioned on both the upstream and downstream side of said filter drum for measuring the pressure drop thereacross;
   (b) a pressure differential switch connected to both sensors and operative to generate an electrical signal when the pressure difference exceeds a predetermined limit; and
   (c) a valve means in the line between said air cylinder and said source of compressed air for activating said air cylinder to move said nozzle from said first position to said second position responsive to receipt of said electrical signal from said pressure differential switch.

5. The filter system according to claim 2 wherein said stripping means further includes:
   (a) a conduit connecting said at least one nozzle and said vacuum source;
   (b) a damper operatively mounted in said conduit for movement between an open and closed position responsive to said control means.

6. The filter system according to claim 5 wherein said means for mounting said at least one nozzle includes a support rod mounted to extend in spaced parallel relation to the periphery of said drum filter to be stripped, a bracket pivotally mounted to said support rod and extending upwards and downwards from the bracket, said at least one nozzle attached to the upper end of said bracket, and the piston of a dual acting air cylinder connected to a source of compressed air and mounted in transverse relation to said support rod and attached to the lower end of said bracket, said air cylinder connected to and operated responsive to said control means, whereby said at least one nozzle is moved back and forth between said first and second positions as said air cylinder is activated in either direction.

7. The filter system according to claim 6 wherein said control means includes:
   (a) a sensor positioned on both the upstream and downstream sides of said filter drum to measure the pressure drop thereacross;
   (b) a pressure differential switch connected to both sensors and operative to generate an electrical signal when the pressure differential exceeds a predetermined limit;
   (c) a solenoid mechanically connected to said damper for opening said damper responsive to said electrical signal; and
   (d) a valve means in the line between said air cylinder and said source of compressed air for activating said air cylinder to move said at least one nozzle from said first position to said second position responsive to receipt of said electrical signal from said pressure differential switch.

8. The filter system according to claim 1 wherein said stripping means for all of said stages includes:
   (a) at least one nozzle mounted adjacent the filter surface to be cleaned and connected to a vacuum source;
   (b) a conduit connecting said at least once nozzle and said vacuum source;
   (c) a damper connected to said control means and operatively mounted in said conduit for movement between opened and closed positions responsive to said control means.

9. The filter system according to claim 8 wherein said control means includes:
   (a) a sensor positioned on both the upstream and downstream side of said filter drum to measure the pressure drop thereacross;
   (b) pressure differential switch operative to generate an electrical signal when the pressure difference exceeds a predetermined limit; and
   (c) a solenoid mechanically connected to said damper for opening said damper responsive to said electrical signal.

10. The filter system according to claim 1 wherein said control means interconnects the stripping means of all filter stages in such a manner that first stage stripping takes precedence over the successive stages and second stage stripping in turn takes precedence over successive stages.

11. A stripping apparatus for continuously rotating cylindrical rotary drum filters of the type in which a contaminated air stream is passed through the surface thereof depositing particles thereon, said stripping apparatus including:
   (a) at least one nozzle connected to a vacuum source;
   (b) control means for automatically and periodically, but not continuously activating said at least one nozzle to effect cleaning of the peripheral surface of said drum filter during operation of the drum;
   (c) means for mounting said at least one nozzle for movement in a radial direction with respect to said rotating drum filter responsive to said control means from a first retracted position out of operative relation with the surface of said drum filter to a second stripping position in operative relation with said drum filter.

12. The stripping apparatus according to claim 11 wherein said means for mounting said at least one nozzle include a support rod mounted to extend in spaced parallel relation to the peripheral of said drum filter to be stripped, a bracket pivotally mounted to said support rod and extending upwards and downwards from said bracket, said at least one nozzle attached to the upper end of said bracket, and a piston of a dual acting air cylinder connected to a source of compressed air and mounted in transverse relation to said support rod and attached to the lower end of said bracket, said air cylinder connected to and operated responsive to said control means whereby said at least one nozzle is moved back and forth between said first and second positions as said air cylinder is activated in either direction.

13. The stripping apparatus according to claim 12 wherein said control means includes:
   (a) a sensor means positioned on both the upstream and downstream side of said filter drum for measuring the pressure drop thereacross;
   (b) a pressure differential switch connected to both sensors and operative to generate an electrical signal when the pressure difference exceeds a predetermined limit; and (c) a valve means in the line between said aid cylinder and said source of compressed air for activating said air cylinder to move said at least one nozzle from said first position to said second position responsive to receipt of said electrical signal from said pressure differential switch.

14. The stripping apparatus according to claim 11 and further including:

(a) a conduit connecting said at least one nozzle and said vacuum source;

(b) a damper operatively mounted in said conduit for movement between an open and closed position responsive to said control means.

15. The stripping apparatus according to claim 14 wherein said control means includes:

(a) a sensor positioned on both the upstream and downstream side of said filter drum to measure the pressure drop thereacross;

(b) a pressure differential switch connected to both sensors and operative to generate an electrical signal when the pressure differential exceeds a predetermined limit; and (c) a solenoid mechanically connected to said damper for opening said damper responsive to said electrical signal.

16. The stripping apparatus according to claim 11 and further including a conduit connecting said at least one nozzle and said vacuum source, and a damper operative and mounted in said conduit for movement between opened and closed positions responsive to said control means.

17. The stripping apparatus according to claim 16 wherein said means for mounting said at least one nozzle includes a support rod mounted to extend in spaced parallel relation to the periphery of said drum filter to be stripped, a bracket pivotally mounted to said support rod and extending upwards and downwards from said bracket, said at least one nozzle attached to the upper end of said bracket, and the piston of a dual acting air cylinder connected to a source of compressed air and mounted in transverse relation to said support rod and attached to the lower end of said bracket, said air cylinder connected to and operated responsive to said control means, whereby said at least one nozzle is moved back and forth between said first and second positions as said air cylinder is activated in either direction.

18. The stripping apparatus according to claim 17 wherein said control means includes:

(a) a sensor positioned on both the upstream and downstream sides of said filter drum to measure the pressure drop thereacross;

(b) a pressure differential switch connected to both sensors and operative to generate an electrical signal when the pressure difference exceeds a predetermined limit;

(c) a solenoid mechanically connected to said damper for opening said damper responsive to said electrical signal; and (d) a valve means in the line between said air cylinder and said source of compressed air for activating said air cylinder to move said at least one nozzle from said first position to said said second position responsive to receipt of said electrical signal from said pressure differential switch.

* * * * *